May 26, 1970  J. J. PHILLIPS  3,513,512
FASTENING ASSEMBLY WITH QUICK RELEASE
Filed Oct. 21, 1968
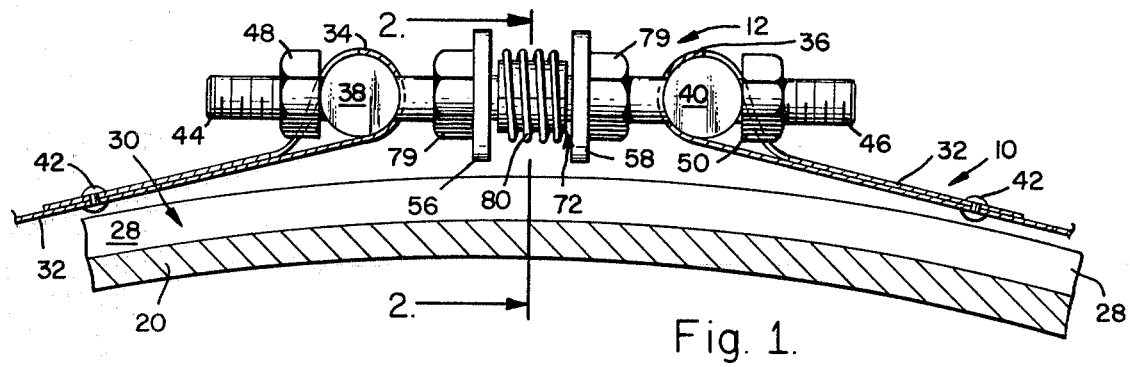
Fig. 1.
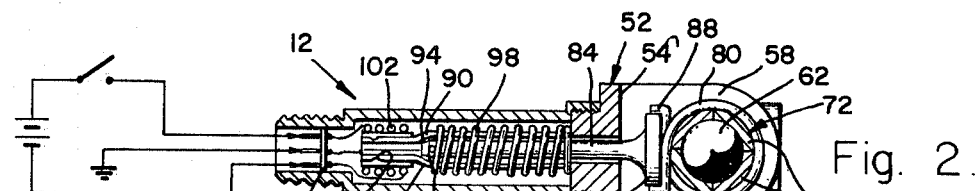
Fig. 2.
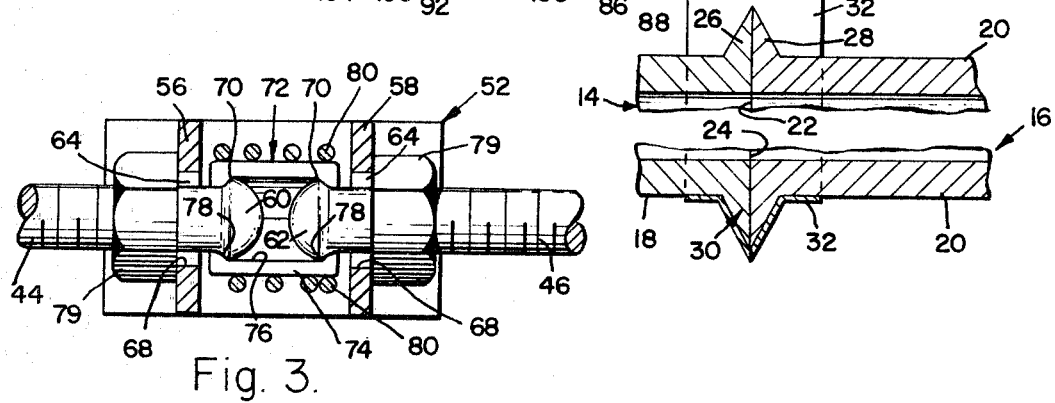
Fig. 3.
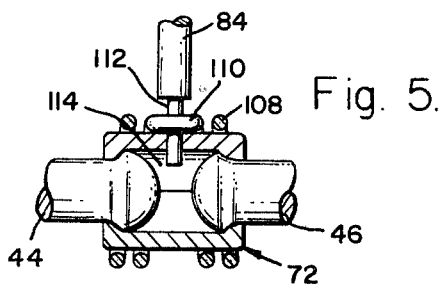
Fig. 5.
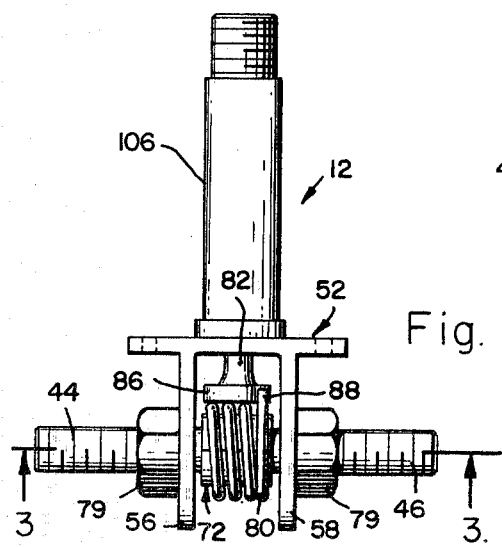
Fig. 4.
John J. Phillips,
INVENTOR.
BY
ATTORNEY.

United States Patent Office 3,513,512
Patented May 26, 1970

3,513,512
FASTENING ASSEMBLY WITH QUICK RELEASE
John J. Phillips, Rolling Hills, Calif., assignor to G & H Technology, Inc., Santa Monica, Calif., a corporation of California
Filed Oct. 21, 1968, Ser. No. 769,054
Int. Cl. B65d *63/00;* F02k *9/06*
U.S. Cl. 24—279             11 Claims

ABSTRACT OF THE DISCLOSURE

This disclosure includes a clamp for securing a plurality of members together and a fast acting release for freeing the clamp and allowing separation of the members The clamp encircles at least a portion of the members and has the adjoining ends thereof drawn together by the release which is effective to produce a large amount of tension in the clamp. A retainer having several pieces held together by an encircling spring prevents release of the clamp. The spring is restrained by a keeper which is actuated by a small electrically conductive wire loaded in tension. When a small electrical current flows through the wire its temperature rises and its tensile strength decreases whereby the wire breaks, the keeper is actuated, the members in the retainer are allowed to separate whereby the clamp and the retained members are released.

BACKGROUND OF INVENTION

Field of invention

The field of this invention includes fastening and clamping means for securing one or more objects together and for very rapidly releasing the clamp and the retained members.

Description of the prior art

Under some circumstances it may be desirable to securely fasten a plurality of very large objects together while still retaining the ability to separate all of the members within a very short interval. For example, it may be desirable for a large number of pipes, logs, telephone poles, etc. to be arranged in a bundle and held together by an encircling band which can be broken to simultaneously release all of the objects in the bundle. It may also be desirable to securely fasten together different parts of a large assembly such as a load carried by an airplane or helicopter, the stages of a missile, etc. into a strong, rigid structure which can be instantly released.

In the prior art there are several different ways of quickly releasing such loads. One common type of quick release utilizes an explosive squib. When a small electrical current circulates through the squib it is detonated whereby the explosion destroys the fastening means, the clamp, etc. and the load is rapidly released. Since squibs are very small, compact, relatively fast acting and require very little electrical power to operate they are frequently used in installations such as aircraft, missiles etc. where weight is important. However, squibs are hazardous and dangerous, subject to premature detonation and sometimes fail to detonate at the required instant. As a consequence the use of squibs has generally been avoided.

Another common type quick release utilizes an electrical solenoid. When an electric current circulates through the solenoid a mechanical motion occurs which opens the release. Solenoids are effective to eliminate the hazards of an explosive squib and are considerably more reliable than the squibs. However, in order to produce the same amount of work the solenoids inherently are considerably heavier and bulkier and require substantially greater amounts of power. Also, because of the inertia they are relatively slow acting.

More recently another type of quick release has been developed which overcomes the disadvantages of squibs and solenoids and retains the advantages of both. Devices of this nature are disclosed and claimed in U.S. Pats. 3,163,732; 3,323,814 and 3,359,804. In this type release a relatively heavy load, such as a strong spring is retained by means of an electrically conductive member, such as a small wire. The wire is loaded in tension to just below its yield point while it is at ambient temperatures. When an electrical current circulates through the wire and its temperature increases toward the region of red hot, the tensile strength of the wire begins to decrease rapidly with further increases in temperature. At some point the strength is reduced below the tension and the wire mechanically breaks, thereby releasing the load.

Quick releases of this nature are very successful in releasing various types of mechanisms and producing various amounts of force for actuating mechanisms. However, these devices, particularly as shown in said patents, have been somewhat limited in the amount of load they can withstand. As a result such release devices have been used primarily on relatively small assemblies, such as separating electrical connectors. In order to increase the load carrying capabilities of this type of release it has been necessary to "scale up" the release, i.e. physically increase all of the dimensions. This in turn has increased the size of the device, the amount of power required to actuate it, the response time, etc.

SUMMARY OF INVENTION

According to the present invention the foregoing limitations of the prior art are overcome by providing a clamp and release which are effective to withstand extremely large forces but can still be operated in extremely short time intervals. The clamp is effective to encompass a plurality of members and produce a very large radial force which secures the members together. The release mechanism is effective upon tightening to produce a very large tensile force within the clamp.

In the limited number of embodiments disclosed herein this is accomplished by providing a pair of threaded members, such as bolts, which are secured together by a multipiece retainer. The pieces of the retainer are all secured together in the locked condition by some form of fastening means such as a circumferentially expanding spring. The spring is in turn maintained in the locked condition by means of a wire loaded in tension. In the event the load is to be released a current circulates through the wire causing it to break and release the load.

BRIEF DESCRIPTION OF THE DRAWINGS

FIG. 1 is a fragmentary end view of a plurality of members which are secured together by a clamp and quick release embodying one form of the invention;

FIG. 2 is a fragmentary cross sectional view taken substantially along the lines of 2—2 in FIGS. 1 and 4;

FIG. 3 is a cross sectional view of the release taken substantially along the plane of line 3—3 in FIG. 4;

FIG. 4 is a plan view of the quick release; and

FIG. 5 is a fragmentary cross sectional view of a quick release embodying another form of the present invention.

DESCRIPTION OF THE FIRST PREFERRED EMBODIMENT

Referring to the drawings in more detail and particularly to FIGS. 1 to 4, the present invention is adapted to be embodied in a clamp 10 and quick release 12 for securing a plurality of objects together. The objects to be secured together may be of any desired variety. For example, they may include a large number of pipes, logs, telephone poles, etc.

However, in the present instance for purposes of illustration the objects to be secured together are relatively large cylindrical structures, such as the adjoining stages 14 and 16 in a missile. At some point in the flight of the missile it may become desirable to separate the stages 14 and 16. This separation should occur as rapidly as possible with as little reaction between the stages as possible.

The two stages 14 and 16 have the ends 22 and 24 thereof mated with each other whereby they are coaxial. The exteriors 18 and 20 of the two stages 14 and 16 are substantially the same diameters adjacent the ends 22 and 24. Each of the mating ends 22 and 24 includes a radial flange 26 and 28 that projects outwardly beyond the exterior. The two flanges 26 and 28 are substantially symmetrical and form a triangular projection 30 which extends completely around the mating ends 22 and 24.

In order to secure the mating ends 22 and 24 together and thereby firmly lock the stages 14 and 16 together the clamp 10 is fitted onto the mating ends. In the present instance this clamp 10 includes a band 32 which is adapted to fit over the two flanges 26 and 28 so as to completely encompass the triangular projection 30. The clamp 10 extends completely around the circumference of the stages 14 and 16 whereby the opposite ends of the band 32 are adjacent to each other. The two ends are folded back upon themselves and fastened by the rivets 42 to form eyes 34 and 36. If desired to increase the strength of the eyes 34 and 36 a bar or pin 38 and 40 may be disposed in each eye 34 and 36.

The quick release 12 is disposed between the two ends of the band 32. It includes a pair of threaded members such as the bolts 44 and 46. The threaded ends of the bolts 44 and 46 extend through the pins 38 and 40. Nuts 48 and 50 may be provided on each of the bolts. When the nuts 48 and 50 are tightened the two ends of the band 32 are forced together.

It can be appreciated that with sufficient tightening of the nuts 48 and 50 the band 32 will be drawn down around the flanges 26 and 28 and against the exterior of the members. If the nuts 48 and 50 are further tightened a very large tension may be created in the band 32 and because of the taper of the flanges 26 and 28 the ends 22 and 24 are forced together. This will retain the two members 14 and 16 securely clamped together.

It can be appreciated the amount of force required to draw the band 32 around the flanges 26 and 28 and securely fasten the two members together requires a very large tension in the band 32. For example, this tension may be on the order of 5,000 to 20,000 pounds or higher.

The release 12 includes a frame 52 having a base 54 and a pair of parallel spaced arms 56 and 58. The heads 60 and 62 of the bolts 44 and 46 project through fittings 64 which are press fitted into openings 68 in the heads 60 and 62 to pass therethrough and the fittings 64 are just tight enough to keep them snugly in position during normal handling. The heads 60 and 62 of the bolts 44 and 46 are enlarged to form tapered surface 70.

A multipiece retainer 72 is provided between the two arms 56 and 58 for securing the enlarged ends together. The present retainer 72 includes several separable members 74, for example four. When these members 74 are joined they form an axial passage 76 containing the enlarged ends of the bolts 44 and 46. The ends of the passage 76 are reduced in diameter to form tapered surfaces 78 which engage the tapered surfaces 70 on the bolts 44 and 46. The nuts 79 may be just tightened enough to keep the bolts 44 and 46 and retainer 72 in position during handling, etc.

It can be appreciated if the two bolts 44 and 46 are pulled axially of the passage 76 the mating tapering surfaces 70 and 78 produce a large radial force on the members 74. If the members 74 are not compressed inwardly the force will spread the members 74 enough to allow the enlarged heads 60 to pass through the reduced ends of the passage 76.

In the present embodiment the members 74 are compressed radially inwardly by a coil spring 80. The spring 80 may be wrapped around the retainer 72 several times (for example 3 to 5 times) to reduce the load on the spring 80 and therefore its size, etc. When the spring 80 is in its free state it expands away from the retainer 72 to allow separation of the members 74, particularly as a result of the axial forces from the enlarged heads 60 and 72 acting on the tapered ends of the passage 76. However, when the spring 80 is twisted against itself for example, about a half turn or so, the spring 80 will contract radially inwardly and compress the pieces 74 of the retainer 72 into intimate engagement with each other. As long as the spring 80 is held in this condition the enlarged heads 60 and 62 of the bolts 44 and 46 will not be able to expand the retainer 72 even if subjected to enormous axial forces.

The spring 80 is maintained compressed by a keeper 82. The keeper 82 includes a stem 84 which extends through the base 54 whereby the keeper 82 may move axially toward or away from the retainer 72. The end of the keeper 82 includes an enlarged head 86 which is effective to fit between the hooked ends 88 of the spring 80. As long as the keeper 82 is extended the spring 80 is maintained in a tightly wrapped condition. However, when the keeper 82 is retracted clear of the hooked ends 88 the spring 80 will be freed and allowed to expand upon the retainer 72. It should be noted that irrespective of the axial force separating the bolts 44 and 46 very little, if any, of this force will be transferred to the keeper 82.

The keeper 82 is maintained in the extended position by a pair of resilient arms 90 and 92 that straddle the stem 84. The arms 90 and 92 include tapered shoulders 94 which bear against the tapered end 96 of the stem 84. Normally the arms 90 tend to spring outwardly whereby the tapered end 96 of the stem 84 is free to move axially away from the retainer 72. A spring 98 surrounds the stem 84 and biases it in this direction.

A bobbin or spool 100 may be fitted around the ends of the arms 90 and 92 for maintaining the arms 90 and 92 compressed together. The tapered shoulders 94 on the arms 90 and 92 fit against the tapered end 96 of the stem 84 and prevent axial movement of the stem 84.

The spool 100 is a multipiece structure similar to the retainer 72. The pieces of the spool 100 are retained together by means of an electrically conductive member, such as a small wire 102. Since the spring 98 is forcing the stem 84 against the shoulders 94 and since the arms 90 and 92 naturally tend to expand, there will be a tension in the wire 102.

It should be noted the tension in the wire 102 is substantially independent of the force in the spring 98 or the forces on the members 74 in the retainer 72. Instead it is controlled substantially entirely by the force in the coil spring 98 and angle of the tapered shoulders 94. As a consequence the tension in this wire 102 can be accurately controled. The tension is set somewhat below the tensile strength of the wire 102 while the wire 102 is at the ambient temperature. However, as the temperature of the wire 102 is raised into an eleveated region approaching red hot, the tensile strength of the wire 102 begins to decrease substantially. Any further increases in the temperature of the wire 102 cause a very large drop in the strength of the wire. As a consequence at some temperature the tensile strength of the wire 102 decreases below the tension in the wire 102 whereby the wire 102 mechanically breaks. It is to be noted this temperature is far below the melting point.

Although the wire 102 may be heated by any suitable means, in the present instance a plug 104 is provided in the end of the housing 106. This plug 104 is coupled to the opposite ends of the wire 102 whereby a current from an external source can be circulated through the wire 102. The current is of sufficient magnitude to rapidly heat the wire 102 into the range where its tensile strength is reduced below the tension in the wire 102 whereby it will break. Since it is not necessary to melt the wire 102 the amount of time is very short and the power required is nominal.

In order to use this device the release 12 is assembled as shown in the drawings and particularly FIG. 4. The spring 98 and tapered shoulder 94 are arranged to stress the wire 102 to just below the breaking point at ambient temperatures. The various members which are to be secured together are assembled into the desired position. In the present instance the two stages 14 and 16 are disposed in an end to end relationship with the flanges 26 and 28 mating. Following this the band 32 is wrapped around the members and the bolts 44 and 46 in the release 12 are extended through the openings in the pins 38 and 40. Following this the nuts 48 and 50 in the two bolts 44 and 46 are tightened.

As the nuts 48 and 50 are tightened the band 32 is stretched and drawn down around the flange 26 and 28 into intimate engagement with the exterior of the stages 14 and 16. It can be appreciated that a very large force can be developed in the band 32 by the tightening of the nuts 48 and 50. In the event the bolts 44 and 46 are not long enough to take up all of the desired slack several releases may be provided in the clamp 10 at circumferentially spaced intervals. Moreover, the use of a plurality of quick releases 12 will allow the separation of the band 32 at several points and since at least any one of the releases will function satisfactorily, an effective separation is assured.

In the event it is desired to separate the members by releasing the clamp 10, an electrical current is circulated through the wire 102. At some point in time the wire 102 will become heated to a level where it will fail. When this occurs the pieces of the spool 100 separate and the spring 98 forces the end of the stem 84 beyond the tapered shoulders 94. When this occurs the head 86 of the keeper 82 is withdrawn from the retainer 72 and between the two hooked ends 88 of the spring 80. This instantly releases the spring 80 whereby it can unwind and expand in a radial direction. The release of the spring 80 and the large radial forces created by bolts 44 and 46 pulling on the tapered surfaces 78 will cause the pieces 74 of the retainer 72 to fly apart whereby the bolts 44 and 46 are freed. The band 32 will pull the heads 60 and 62 and the fittings 64 through the openings 68. The band will then spring away from the flanges 26 and 28 on the stages 14 and 16 whereby the members 74 will be separated.

It has been found under some circumstances it may be desirable to use the embodiment of FIG. 5. This embodiment is substantially identical to the preceding embodiment except the spring 108 is symmetrically wound around the center line of the retainer 72 whereby an eye 110 is formed in the middle of the spring 108. The two outer ends of the spring 108 are anchored to the retainer 72 adjacent its opposite ends. A pin 112 extends through the eye 110 and into an opening 114 in one of the pieces 74 of the retainer 72. This pin 112 may be formed by the end of the stem 84. Accordingly, circulating a current through the wire 102 will release the stem 84 and withdraw the pin 112 and release the spring 80.

It can be appreciated that irrespective of the magnitude of the axial forces on the bolts and the tensions in the spring, these loads will not produce any axial forces on the stem. As a result the tensions in the wire are controlled entirely by the spring and the angles of the complementary tapered surfaces. Accordingly, a substantially infinite mechanical advantage can be obtained whereby extremely large forces can be retained by a very small wire. This in turn permits a very fast acting and reliable release.

I claim:
1. A fastening assembly for maintaining a plurality of members secured together, said assembly including the combination of
    a band having eyes in the opposite ends thereof, said band encompassing at least a portion of said members with said eyes disposed adjacent each other,
    a fastener secured to each of said eyes, said fasteners including tightening means for pulling on said band and creating a large amount of tension in said band and said fasteners,
    a tapered shoulder on each of said fasteners,
    a plurality of retainers encompassing said fasteners and engaging said shoulder for maintaining said fasteners secured together against the tension therein, said shoulder and said tension being effective to bias said retainers radially outwardly whereby said tapered shoulders are free to pass through said retainers,
    a resilient member encompassing said retainers and compressing them radially inwardly against said shoulder to prevent the retainers moving radially outwardly,
    a keeper engaging said resilient member and maintaining it around said retainers so as to prevent the release thereof,
    an electrically conductive thermal member coupled to said keeper for maintaining said keeper in engagement with said resilient member,
    spring means producing a predetermined tension in said conductive member, and
    means for circulating an electrical current through said wire so as to heat said wire to a predetermined temperature whereby the tensile strength of the wire is decreased below the tension therein and said wire breaks.

2. A fastening assembly for maintaining a plurality of members secured together, said assembly including the combination of
    a clamp for encompassing at least a portion of said members and having the ends thereof disposed adjacent each other,
    at least one fastener secured to one of said ends, said fastener being effective to produce a tension in said clamp whereby said members are secured together,
    a tapered shoulder on said fastener,
    a plurality of retainers encompassing said fastener and having tapered surfaces engaging said shoulder, said surfaces being effective to hold said fastener against said tension for as long as said retainers encompass said fastener, said surfaces and said shoulder being effective to bias the retainers whereby the surfaces are spread beyond the shoulder and the fastener is released,
    a member encompassing said retainers and compressing them radially inwardly to prevent the spreading thereof,
    a keeper engaging said member and maintaining it around said retainers, and
    an electrically conductive thermal member loaded in tension and effective to maintain said keeper in engagement with said member, said electrically conductive member being effective to break from said tension when heated above a predetermined point whereby said keeper releases said retainers and allows them to separate from the shoulders.

3. The fastening assembly of claim 2 wherein
    said member is a resilient coil spring which spirally encompasses said retainers, said spring having a free diameter in excess of the diameter of said retainers whereby it will naturally unwind from the retainers when the keeper is released by the breaking of the thermal member.

4. The fastening assembly of claim 3 wherein said spring includes,
an eye disposed adjacent the center thereof, the portions of the spring on opposite sides of the eye having opposed pitches, and
said keeper is a pin which extends through said eye and into said retainer and into at least one of said retainers.

5. The fastening assembly of claim 3 wherein
the pitch of said spring is in the same direction over its entire length, and
the keeper engages the opposite ends of the spring and prevents the unwinding thereof.

6. A release of the class described including
a pair of elongated fastener members axially aligned with each other,
enlarged heads on the adjacent ends of said members, each of said heads including a tapered surface,
a plurality of retainer members encompassing said heads and engaging said shoulders and retaining said fastener member against axial movement,
a resilient member encompassing the retainer members and compressing them radially inwardly, and
electrically conductive means coupled to said resilient members for maintaining the retainer members compressed against said head.

7. The release of claim 6 wherein
said electrically conductive means includes a conductive wire which is loaded in tension, and means for circulating an electrical current through said wire and heating it above a predetermined temperature at which the wire breaks.

8. The release of claim 7 wherein
a spring maintains said wire under a predetermined tension.

9. A release of the class described including
a pair of elongated axially aligned fastening members,
enlarged heads on the adjacent ends of said members, each of said heads including a tapered surface,
a plurality of retainer members mated with each other in a substantially cylindrical configuration and surrounding said heads, and tapered shoulders engaging said tapered surface and preventing axial movement of the fastening members, said shoulders and surface being effective to bias the retainer members radially outwardly so as to release the fastening members,
a spring encompassing said retainer members and compressing them into mating engagement and maintaining them in said cylindrical configuration whereby the fastening members are restrained against axial movement, and
keeper means coupled to said spring and effective to maintain said spring around the retainer members, and
an electrically conductive wire in said keeper, said wire being loaded in tension and effective to break when heated above a predetermined temperature by an electric current whereby said keeper releases said spring.

10. The release of claim 9 wherein
said spring includes a center eye with counter wound symmetrically disposed portions on the opposite side thereof, and
the keeper includes a pin which extends through the eye and through at least one of said retainer members.

11. The release of claim 9 wherein
said spring has a pitch of the same direction over its entire length and has the ends thereof disposed adjacent said retainer members, and
said keeper engages the ends of said spring and prevents it from unwinding.

References Cited

UNITED STATES PATENTS

| | | | |
|---|---|---|---|
| 2,809,584 | 10/1957 | Smith | 102—49.5 |
| 3,122,098 | 2/1964 | Glennan | 102—49.5 |
| 3,388,933 | 6/1968 | Philips | 24—279 XR |

DONALD A. GRIFFIN, Primary Examiner

U.S. Cl. X.R.

102—49.5